US009062203B2

(12) United States Patent
Kochi et al.

(10) Patent No.: US 9,062,203 B2
(45) Date of Patent: Jun. 23, 2015

(54) BINDER COMPOSITION, REINFORCING-FIBER BASE MATERIAL, PREFORM, FIBER-REINFORCED COMPOSITE MATERIAL, AND MANUFACTURING METHOD THEREFOR

(75) Inventors: Shinji Kochi, Ehime (JP); Kenichi Yoshioka, Ehime (JP); Masayuki Miyoshi, Ehime (JP)

(73) Assignee: TORY INDUSTRIES INC., Tokyo (JP)

( * ) Notice: Subject to any disclaimer, the term of this patent is extended or adjusted under 35 U.S.C. 154(b) by 597 days.

(21) Appl. No.: 13/496,759

(22) PCT Filed: Sep. 14, 2010

(86) PCT No.: PCT/JP2010/065790
§ 371 (c)(1),
(2), (4) Date: Mar. 16, 2012

(87) PCT Pub. No.: WO2011/034040
PCT Pub. Date: Mar. 24, 2011

(65) Prior Publication Data
US 2012/0178329 A1   Jul. 12, 2012

(30) Foreign Application Priority Data
Sep. 16, 2009   (JP) ................. 2009-214229

(51) Int. Cl.
| C08L 77/00 | (2006.01) |
| C08L 77/06 | (2006.01) |
| C08J 5/04  | (2006.01) |
| C08J 5/24  | (2006.01) |
| D04H 1/587 | (2012.01) |
| B29C 70/48 | (2006.01) |
| C08K 5/435 | (2006.01) |
| C08K 7/02  | (2006.01) |

(52) U.S. Cl.
CPC .. C08L 77/06 (2013.01); C08J 5/04 (2013.01); C08J 5/24 (2013.01); D04H 1/587 (2013.01); B29C 70/48 (2013.01); C08J 2377/06 (2013.01); C08K 5/435 (2013.01); C08K 7/02 (2013.01)

(58) Field of Classification Search
USPC .................. 525/178, 179, 183, 420
See application file for complete search history.

(56) References Cited

U.S. PATENT DOCUMENTS

| 4,181,775 A * | 1/1980 | Corke .............................. 428/348 |
| 4,992,228 A | 2/1991 | Heck |
| 5,217,766 A | 6/1993 | Flonc |
| 5,252,672 A * | 10/1993 | Heger et al. ..................... 525/178 |
| 5,369,192 A | 11/1994 | Ko |
| 5,427,725 A | 6/1995 | White |
| 5,698,318 A | 12/1997 | Burton |
| 2004/0030061 A1 | 2/2004 | McGrail |
| 2004/0170554 A1 | 9/2004 | Wadahara et al. |
| 2011/0294910 A1* | 12/2011 | Kriha et al. ..................... 521/59 |

FOREIGN PATENT DOCUMENTS

| JP | 58-108221 A | 6/1983 |
| JP | 61-289122 A | 12/1986 |
| JP | 62297314 | 12/1987 |
| JP | 63-221124 A | 9/1988 |
| JP | 2198815 | 8/1990 |
| JP | 4-253727 A | 9/1992 |
| JP | 2001-302908 | 10/2001 |
| JP | 2003-80607 A | 3/2003 |
| JP | 2004-43621 A | 2/2004 |
| JP | 2005-53961 A | 3/2005 |
| JP | 2005-194456 | 7/2005 |
| JP | 2006-326892 A | 12/2006 |
| JP | 2009-127169 A | 6/2009 |
| JP | 2009-221460 A | 10/2009 |
| JP | 62297315 | 5/2012 |
| WO | 98/50211 | 11/1998 |

OTHER PUBLICATIONS

International Search Report mailed Dec. 21, 2010, for PCT/JP2010/065790.
International Preliminary Report on Patentability mailed Apr. 11, 2012, for PCT/JP2010/065790.

* cited by examiner

*Primary Examiner* — Ana Woodward
(74) *Attorney, Agent, or Firm* — Pillsbury Winthrop Shaw Pittman LLP

(57) ABSTRACT

A binder composition comprising [A] an amorphous polyamide with a glass transition temperature of 140° C. or higher having a dicyclohexylmethane skeleton in the molecule and [B] a sulfonamide compound is used to provide a binder composition, a reinforcing-fiber base material and a preform respectively most suitable for RTM, which respectively exhibit excellent impact resistance and physical properties remaining stable over the variations of molding conditions and can be used for producing a fiber-reinforced composite material most suitable for members such as primary structures of aircraft.

5 Claims, No Drawings

BINDER COMPOSITION, REINFORCING-FIBER BASE MATERIAL, PREFORM, FIBER-REINFORCED COMPOSITE MATERIAL, AND MANUFACTURING METHOD THEREFOR

TECHNICAL FIELD

The present invention relates to a fiber-reinforced composite material, a manufacturing method therefor, and a preform, a reinforcing-fiber base material and a binder composition respectively used for the fiber-reinforced composite material.

BACKGROUND ART

Fiber-reinforced composite materials composed reinforcing fibers such as carbon fibers or glass fibers and a thermosetting resin such as an epoxy resin or phenol resin are light in weight and excellent in mechanical properties such as strength and rigidity, heat resistance and corrosion resistance, and therefore have been used in many fields such as aircraft, spacecraft, motor vehicles, rolling stock, ships, civil engineering & architecture and sporting goods. Especially for uses requiring high performance, fiber-reinforced composite materials using continuous reinforcing fibers are used. As reinforcing fibers, carbon fibers excellent in specific strength and specific modulus are popularly used, and as matrix resins, epoxy resins excellent in mechanical properties and adhesion to carbon fibers are popularly used.

Fiber-reinforced composite materials are produced by various methods. Resin transfer molding (hereinafter abbreviated as RTM) in which a liquid thermosetting resin composition is injected into a reinforcing-fiber base material disposed in a mold and heated and cured to obtain a fiber-reinforced composite material attracts attention in recent years as a molding method excellent in productivity and low in cost.

In the case where a fiber-reinforced composite material is produced by RTM, it is often practiced that a preform is prepared by processing a reinforcing-fiber base material into a shape close to that of a desired composite material and installed in a mold and that subsequently a liquid thermosetting resin is poured into the mold.

As methods for preparing a preform, several methods are known such as a method of preparing a three-dimensional braid from reinforcing fibers and a method of laminating and stitching layers formed of a reinforcing-fiber woven fabric. A known very universal method is to laminate and shape layers formed of a sheet-like base material such as a reinforcing-fiber woven fabric using a hot-melt binder (also called a tackifier).

As the hot-melt binder, a resin composition that is not adhesive at room temperature but is softened to be adhesive at a high temperature is used. As the hot-melt binder, either of both a thermoplastic resin and a thermosetting resin can be used as described in patent document 1.

In the case where a thermoplastic resin is used as the hot-melt binder, since the glass transition temperature or melting point of the thermoplastic resin is relatively high, a very high temperature is required for thermally fusion-bonding the overlying regions adjacent to each other of a reinforcing-fiber base material. Consequently the productivity is low.

In the case where a thermosetting resin is used as the hot-melt binder, the binder per se can be of a type having curability (patent documents 2 to 4) or a type not having curability (patent documents 5 and 6). The former is excellent since it is curable irrespective of whether it is a liquid thermosetting resin, and the latter is excellent in storage stability.

On the other hand, a fiber-reinforced composite material containing a thermosetting resin such as an epoxy resin as a matrix resin has a problem that the impact resistance thereof declines, since the cured thermosetting resin is generally lower in fracture toughness than a thermoplastic resin. Especially since structural members of aircraft are required to be excellent in impact resistance against such impacts as the drop of a tool during assembling and hail during flying, the enhancement of impact resistance has been a large issue.

A fiber-reinforced composite material generally has a lamination structure, and if an impact acts on it, a high stress occurs between the respective layers, to cause cracking. For inhibiting cracking, it is effective to enhance the plastic deformability of the thermosetting resin, and as a means for it, mixing a thermoplastic resin with excellent plastic deformability is effective.

Various methods for mixing a thermoplastic resin have been examined using the prepreg method which is one of molding methods for producing fiber-reinforced composite materials. For example, there is a method of using a highly tough thermosetting resin enhanced in toughness by dissolving a thermoplastic resin into a thermosetting resin, as a matrix resin (see patent documents 7 and 8). However, if a thermoplastic resin is mixed with a thermosetting resin, the viscosity rises remarkably, and consequently there is a limit to the thermoplastic resin content, thus this method being not suitable especially for RTM in which the viscosity of the matrix resin is limited.

Further, as another means for enhancing the impact resistance, a method of making a thermoplastic resin or an elastomer exist between the respective layers where cracking is likely to occur. This method can be applied also to RTM by applying the aforementioned binder technique. In a fiber-reinforced composite material prepared by using a preform obtained by bonding the respective layers formed of a sheet-like base material such as a reinforcing-fiber woven fabric to each other by a binder, the binder component exists between the respective layers.

A thermoplastic resin has a problem of high processing temperature, since the glass transition temperature or melting point is high as described before. Accordingly, the processing temperature can be adjusted by mixing a thermosetting resin with the thermoplastic resin (patent documents 9 and 10). However, in the case where any of the binders described in these documents is used, the solubility of the binder may change due to the changes of molding conditions, especially the changes of temperature and heating rate, and it is difficult to exhibit the same toughness stably.

PRIOR ART DOCUMENTS

Patent Documents

Patent document 1: JP 2-198815 A
Patent document 2: U.S. Pat. No. 5,427,725
Patent document 3: U.S. Pat. No. 5,698,318
Patent document 4: U.S. Pat. No. 5,369,192
Patent document 5: U.S. Pat. No. 4,992,228
Patent document 6: U.S. Pat. No. 5,217,766
Patent document 7: JP 62-297314 A
Patent document 8: JP 62-297315 A
Patent document 9: US Patent Publication No. 2004/030061
Patent document 10: WO 98/50211

SUMMARY OF THE INVENTION

Problem to be Solved by the Invention

As described above, the binders for preparing the preforms usable in RTM and the enhancement of impact resistance of fiber-reinforced composite materials have been examined variously, but all the conventional techniques had shortcomings. Especially there were no techniques satisfactory for the aircraft members requiring stable high-performance materials.

The object of this invention is to provide a binder composition, a reinforcing-fiber base material and a preform which can be used for producing a fiber-reinforced composite material suitable for members such as primary structures of aircraft by RTM wherein the fiber-reinforced composite material exhibits excellent impact resistance and physical properties remaining stable over the variations of molding conditions.

Means for Solving the Problem

This invention is a binder composition containing the following components [A] and [B]:
[A] An amorphous polyamide with a glass transition temperature of 140° C. or higher, having a dicyclohexylmethane skeleton in the molecule; and
[B] A sulfonamide compound.

A preferred mode of the binder composition is to comply with the following conditions (I) and (II):
Condition (I): The glass transition temperature of the binder composition is 40 to 90° C.; and
Condition (II): When the mixture obtained by mixing 10 parts by mass of the binder composition with 100 parts by mass of an epoxy resin containing 40 mass % or more of N,N,N',N'-tetraglycidyl-4,4'-methylenedianiline and stirring at a temperature of 180° C. for 1 hour is observed at a magnification of 5× using a light-field optical microscope, a solid with particle sizes of 10 μm or larger can be observed, and the viscosity of the filtrate remaining after filtering away the solid is 5 times or less the viscosity of the epoxy resin.

A more preferred mode is a binder composition containing 40 to 80 mass % of the component [A] and 10 to 40 mass % of the component [B]

As the component [A], a polyamide containing 3,3'-dimethyl-4,4'-diaminodicyclohexylmethane units is most preferred. As the component [B], toluenesulfonamide is most preferred.

A further more preferred mode is that the form of the binder composition is particles with a volume average particle size of 30 to 200 μm.

The reinforcing-fiber base material of this invention contains the binder composition of this invention and reinforcing fibers. In a more preferred mode, the reinforcing fibers are a woven fabric of a non-crimp structure, consisting of warp yarns composed of carbon fiber bundles, auxiliary warp yarns composed of glass fibers or chemical fibers arranged in parallel to the warp yarns, and weft yarns composed of glass fibers or chemical fibers arranged perpendicularly to the warp yarns, wherein the auxiliary warp yarns and the weft yarns are crossed over and under each other for holding the carbon fiber bundles integrally, and the content of the aforementioned binder composition is 5 to 50 g/m$^2$ as weight per unit area.

In a preferred mode of the preform of this invention, layers formed of the aforementioned reinforcing-fiber base material are laminated, and the aforementioned binder composition is made to exist between the respective layers formed of the reinforcing-fiber base material.

The fiber-reinforced composite material of this invention contains the aforementioned preform and a cured epoxy resin.

The method for producing the fiber-reinforced composite material of this invention comprises the steps of placing the aforementioned preform in a cavity formed by a rigid open mold and a flexible film, sucking the cavity by a vacuum pump, pouring a liquid thermosetting resin composition into the cavity from an inlet using atmospheric pressure for impregnation into the preform, and subsequently heating and curing the liquid thermosetting resin composition.

Effects of the Invention

The binder composition of this invention is insoluble in a thermosetting resin, especially an epoxy resin used as the matrix resin of a fiber-reinforced composite material, and therefore undergoes only small changes of mechanical properties caused by the variations of molding conditions, especially temperature and heating rate, being able to enhance the productivity of the fiber-reinforced composite material.

The fiber-reinforced composite material having the binder composition of this invention is excellent in impact resistance against the impacts from outside and has high compression-after-impact (CAI) strength. Consequently it can be suitably used as structural members such as aircraft members, spacecraft members, vehicle members and ship members.

MODES FOR CARRYING OUT THE INVENTION

The binder composition of this invention contains at least the following components [A] and [B]:
[A] An amorphous polyamide with a glass transition temperature of 140° C. or higher, having a dicyclohexylmethane Skeleton in the molecule
[B] A sulfonamide compound In this description, a polyamide being "amorphous" specifically means that when the polyamide is measured by a differential scanning calorimeter (DSC) according to JIS K 7121 (1987), the crystal melting calorie is 5 cal/g or less. It is preferred that the crystal melting calorie is 1 cal/g or less. In order to satisfy the property, in this invention, a polyamide containing diamine units having a dicyclohexylmethane skeleton as an essential component is used. As the diamine, 3,3'-dimethyl-4,4'-diaminodicyclohexylmethane and 4,4'-diaminodicyclohexylmethane and the like can be enumerated. One of them can be used alone, or two or more of them can also be used as a mixture. As the diamine, especially 3,3'-dimethyl-4,4'-diaminodicyclohexylmethane can be preferably used since a polyamide excellent in the balance of physical properties can be obtained. Further, a small amount of a diamine having one cyclohexane ring in the molecule such as 1,3-bisaminomethylcyclohexane, 1,4-bisaminomethylcyclohexane or the like can also be copolymerized.

Such a diamine and a dicarboxylic acid can be polymerized to obtain an amorphous polyamide. As preferred dicarboxylic acids, adipic acid, azelaic acid, sebacic acid, dodecanoic diacid, cyclohexanedicarboxylic acid, isophthalic acid, terephthalic acid and the like can be enumerated. It is preferred to polymerize at a ratio of 95 to 30 mass % of a diamine and 5 to 70 mass % of dicarboxylic acid.

The amorphous polyamide is required to have a glass transition temperature of 140° C. or higher when measured by a differential scanning calorimeter (DSC) according to JIS K 7121 (1987). It is preferred that the glass transition temperature is 150° C. or higher. If the glass transition temperature of the amorphous polyamide is lower than 140° C., the heat resistance of the obtained fiber-reinforced composite material declines, and especially the mechanical properties at high temperature after water absorption declines greatly. If the glass transition temperature is 140° C. or higher, the decline of physical properties can be inhibited.

As the amorphous polyamide, a polyamide synthesized by using the aforementioned diamine or a commercially available polyamide can be used. As commercially available amorphous polyamides, "Novamid" (registered trademark) (produced by Mitsubishi Engineering-Plastics Corporation), "Glamide" (registered trademark), (produced by Toyobo Co., Ltd.), "Grilamid" (registered trademark) TR (EMS-CHEMIE (Japan) Ltd.), "Trogamid" (registered trademark) T (Daicel-Evonik Ltd.) and the like can be enumerated.

It is preferred that the binder composition of this invention complies with the aforementioned condition (I), i.e., a glass transition temperature of 40 to 90° C. so that the shape of the preform can be fixed at a relatively low temperature, for example, a temperature in a range of 60 to 100° C. In this description, the glass transition temperature of the binder composition is measured according to JIS K 7121 (1987). It is preferred that the glass transition temperature of the binder composition is in a range from 45 to 85° C., and a more preferred range is 50 to 80° C. In the case where the glass transition temperature of the binder composition is lower than 40° C., the binder composition is fused to itself during transport or storage at room temperature, and a cost is needed for temperature control. Further, in the case where the glass transition temperature of the binder composition is higher than 90° C., the shape of the preform cannot be fixed at a relatively low temperature to lower working efficiency, thereby raising the cost unpreferably.

If the sulfonamide compound as the component [B] is mixed, the glass transition temperature of the binder composition can be adjusted in a range from 40 to 90° C. As preferred sulfonamide compounds, for example, o-toluenesulfonamide, p-toluenesulfonamide, N-ethyl-o/p-toluenesulfonamide, N-cyclohexyl-p-toluenesulfonamide, p-ethylbenzenesulfonamide, N-n-butylbenzenesulfonamide and the like can be enumerated. One of the sulfonamide compounds can be used alone, or two or more of them can also be used as a mixture. Especially toluenesulfonamides typically exemplified by o-toluenesulfonamide, p-toluenesulfonamide, a mixture thereof and the like can be preferably used, since they are excellent in compatibility with the amorphous polyamide used as the component [A].

In the binder composition, it is preferred that the content of the component [A] is 40 to 80 mass %, and a more preferred range is 45 to 75 mass %. It is preferred that the content of the component [B] is 10 to 40 mass %, and a more preferred range is 15 to 35 mass %. It is preferred that the contents of the components [A] and [B] are in those ranges, since the glass transition temperature of the binder composition can be easily adjusted in a range from 40 to 90° C.

A fiber-reinforced composite material generally has a lamination structure, and if an impact acts on it, a high stress occurs between the respective layers, to cause delamination damage. Therefore, in the case where the impact resistance against the impacts from outside is desired to be enhanced, it is only required to enhance the toughness of the resin layers formed between the respective layers formed of the fiber-reinforced composite material. As the matrix resin used to form the fiber-reinforced composite material, a thermosetting resin that is a brittle material, especially an epoxy resin is often used. In order to enhance the toughness of an epoxy resin, a technique of mixing a thermoplastic resin is known.

However, in the case of RTM, since the matrix resin is desired to have a low viscosity, it is not preferred that a thermoplastic resin capable of remarkably raising the viscosity is dissolved into the matrix resin in advance.

Therefore, in the case where a thermoplastic resin is dissolved into the matrix resin, it is preferred to dissolve during molding. However, in this case, since the solubility of the thermoplastic resin changes depending on the variations of molding conditions, especially temperature and heating rate, it is difficult to stably exhibit toughness. Especially an aircraft member or the like is often large and complicatedly shaped, and when such a member is molded, the molding conditions are likely to vary. Further, in the case where a thermoplastic resin soluble in the matrix resin is used, the thermoplastic resin may be dissolved in the matrix resin in the resin pouring step of RTM as the case may be. In this case, the viscosity of the matrix resin rises, and poor impregnation may occur as the case may be.

In view of the above, it is required that the binder composition is unlikely to be dissolved in the epoxy resin often used as the main agent of the matrix resin. Specifically, it is preferred that the binder composition of this invention complies with the aforementioned condition (II). That is, it is preferred that after the mixture obtained by mixing 10 parts by mass of the binder composition of this invention with 100 parts by mass of an epoxy resin is stirred at a temperature of 180° C. for 1 hour, the solid as the binder composition remains, and that the viscosity of the filtrate obtained by filtering away the remaining solid is 5 times or less the viscosity of the epoxy resin not yet mixed. In this case, the solid remains means that when the stirred mixture is observed at a magnification of 5× using a light-field optical microscope, the solid with a particle size of 10 μm or larger of the binder composition can be observed. In this case, the particle size refers to the size obtained by measuring the particle sizes of at least 20 or more solid particles from an image of an optical microscope, and averaging them. In the case where the solid particles are aspherical, the length of the longest axis of each particle is selected as the particle size of the solid particle. Further, the epoxy resin used for measurement is the epoxy resin used as the matrix resin. In this invention, especially a case where high heat resistance and high elastic modulus are required as with an aircraft member or the like is assumed, N,N,N',N'-tegraglycidyl-4,4'-methylenedianiline is used as the epoxy resin for measurement. Meanwhile, any other preferred epoxy resin described later can also be mixed, but in this case, it is necessary that the epoxy resin mixture contains 40 mass % or more of N,N,N',N'-tetraglycidyl-4,4'-methylenedianiline. Further, at the time of measurement, a curing agent of the epoxy resin is not added.

The aforementioned viscosity of the filtrate being 5 times or less the viscosity of the epoxy resin not yet mixed means that the viscosity of the epoxy resin mixed with the binder composition is not so higher than the viscosity of the epoxy resin not yet mixed with the binder composition.

The solid of the binder composition remaining and the viscosity of the epoxy resin not rising when the binder composition and the epoxy resin are mixed mean that the binder composition is unlikely to be dissolved in the epoxy resin. In the case where the binder composition is dissolved in the epoxy resin so much that the solid does not remain, the molding conditions may change depending on the degree of dissolution, and as a result, the mechanical properties of the obtained fiber-reinforced composite material may change. Further, in the case where the aforementioned viscosity of the filtrate is higher than 5 times the viscosity of the epoxy resin not yet mixed, poor resin impregnation may occur in the step of pouring the resin for RTM.

The amorphous polyamide of the component [A] of this invention is very poor in compatibility with the epoxy resin and is insoluble in the epoxy resin when the amorphous polyamide only is added. Therefore, if the content of the component [B] is 40 mass % or less, the binder composition can comply with the condition (II). Especially in the case where the component [A] is a polyamide containing 3,3'-dimethyl-4,4'-diaminodicyclohexylmethane units, this tendency is preferably remarkable.

That is, the binder composition of this invention could be obtained when it was found that if the component [B] is mixed with the component [A] poor in compatibility with an epoxy resin and having a high glass transition temperature, the compatibility with the epoxy resin and the glass transition temperature of the binder composition can be adjusted in adequate ranges.

With the binder composition, a thermoplastic elastomer can be further mixed as component [C] to such an extent that the effects of this invention are not impaired. In this description, the thermoplastic elastomer is a block copolymer having a hard segment component and a soft segment component in the molecule and has a glass transition temperature lower than room temperature and a melting point higher than room temperature, being a polymer showing flowability when heated to higher than the melting point and showing rubber elasticity when cooled to a temperature between the glass transition temperature and the melting point. A thermoplastic elastomer mixed with the binder composition presents such advantages that the deformability of the binder composition at the temperature for fixing the shape of the preform, for example, at a temperature in a range from 60 to 100° C. and the adhesion of the binder composition to reinforcing fibers can be enhanced, and that the compression-after-impact (CAI) strength of the obtained fiber-reinforced composite material can be enhanced.

As the thermoplastic elastomer, one or more selected from such thermoplastic elastomers as urethane elastomers, polyester elastomers and polyamide elastomers can be used. Especially a polyamide-based thermoplastic elastomer is excellent in the compatibility with the components [A] and [B] and excellent in the balance of physical properties such as heat resistance and toughness, and therefore can be suitably used.

A polyamide-based thermoplastic elastomer is a block copolymer having a polyamide such as polyamide 6 or polyamide 12 as a hard segment component and a polyester or polyol as a soft segment component. Above all, a polyamide elastomer having a polymerized fatty acid- or dimer acid-based polyamide as a hard segment component is excellent in the balance of hydrolyzability, heat resistance and toughness, and therefore can be suitably used.

As the thermoplastic elastomer, a synthesized product or commercially available product can be used. As commercially available products, for example, polyester elastomers such as "Hytrel" (registered trademark) (produced by Du Pont-Toray Co., Ltd.) and "Pelprene" (registered trademark) (produced by Toyobo Co., Ltd.), urethane elastomers such as "PANDEX" (registered trademark) (produced by DIC Bayer Polymer Ltd.) and "Miractran" (registered trademark) (produced by Nippon. Miractran Co., Ltd.), polyamide elastomers such as "UBESTA XPA" (registered trademark) (produced by Ube Industries, Ltd.), "GRILFLEX" (registered trademark) (produced by EMS-CHEMIE (Japan) Ltd.) and the like can be enumerated. Above all, TPAE series (produced by Fuji Kasei Kogyo K.K.) as polymerized fatty acid- or dimer acid-based polyamide elastomers can be preferably used for the abovementioned reason.

It is preferred that the content of a thermoplastic elastomer as the component [C] is 5 to 25 mass %, and a more preferred range is 7 to 20 mass %. If the content of the component [C] is kept in this range, the thermal deformability of the obtained binder composition and the adhesion of the binder composition to reinforcing fibers can be enhanced, and further the compression-after-impact (CAI) strength of the obtained fiber-reinforced composite material can be enhanced.

Furthermore, components other than the components [A], [B] and [C], for example, an antioxidant such as hindered phenol or hindered amine; a salicylic acid-based, benzophenone-based or triazine-based ultraviolet light absorber; rubber particles or core-shell polymer particles; inorganic particles and the like can be mixed, as appropriate, with the binder composition of this invention to such an extent that the effects of this invention are not impaired.

As the form of the binder composition of this invention, a film or tape provided with through holes, long fibers, short fibers, spun yarns, woven fabric, knitted fabric, nonwoven fabric, net-like body, particles, or the like can be employed. In the case where a reinforcing-fiber base material obtained by combining the binder composition of this invention and reinforcing fibers is used to mold a member, the reinforcing-fiber base material is formed into a complicated shape. In this case, since particles are a form excellent in shape followability, it is preferred that the binder composition is formed as particles.

In the case where the binder composition of this invention is formed as particles, it is preferred that the volume average particle size measured by a laser diffraction/scattering particle size distribution measuring apparatus according to JIS Z 8825-1 (2001) is 30 to 200 μm. A more preferred range is 35 to 180 μm. In this case, as the laser diffraction/scattering particle size distribution measuring apparatus, Partica LA-950V2 (produced by Horiba, Ltd.) is used for measuring at a capture frequency of 15 times. The particle size distribution is obtained on the assumption that the measured particles are spherical. In the case where the actual shape of particles is aspherical (amorphous particles), the obtained particle size distribution becomes broad. Further, in the case where the particles measured are needles, since signals of minor axes are difficult to read, the obtained particle size distribution is of major axes. If the volume average particle size is 30 μm or larger, the particles do not excessively penetrate into the reinforcing-fiber base material, and even a small amount of a binder composition can efficiently exhibit the effect of binding the reinforcing-fiber base material, and further the particles have sufficient flowability, allowing the binder composition to be easily handled. On the other hand, if the volume average particle size is 200 μm or smaller, it can be prevented that the preform undulates to adversely affect the physical properties of the fiber-reinforced composite material.

Further, since the binder composition of this invention is thermally stable, there is no major limitation to the method for preparing it, and various publicly known methods can be used. The most economical method is to knead the respective components at approx. 150 to approx. 220° C. using an extruder, kneader or the like. The obtained binder composition can be ground into particles or can also be melt-extruded from a die, to be processed into a form of fibers or a film. Further, a method of once dissolving the binder composition into a solvent, to prepare a solution, and then removing the solvent can also be used. Furthermore, usable is a method of dispersing the organic solvent solution into water, to make an emulsion, and heating the emulsion, to volatilize the solvent, thereby obtaining a dispersion that is then filtered, for securing particles.

The binder composition of this invention is used as a reinforcing-fiber base material having the binder composition and reinforcing fibers.

As the reinforcing fibers, carbon fibers can be preferably used. As the carbon fibers, specifically acrylic carbon fibers, pitch-based carbon fibers, rayon-based carbon fibers and the like can be enumerated. Especially acrylic carbon fibers with high tensile strength can be preferably used. As the form of carbon fibers, twisted yarns, untwisted yarns, non-twisted yarns or the like can be used. However, in view of good balance between the moldability and strength properties of the fiber-reinforced composite material, untwisted yarns or non-twisted yarns can be preferably used.

It is preferred that the tensile modulus of carbon fibers is in a range from 200 to 400 GPa in view of the properties and weight of the molded structural member. If the elastic modulus is lower than the range, the rigidity of the structural member may be insufficient as the case may be. On the contrary if the elastic modulus is higher than the range, the strength of carbon fibers tends to decline. A more preferred elastic modulus range is 250 to 370 GPa, and a further more preferred range is 290 to 350 GPa. In this description, the tensile modulus of carbon fibers is measured according to JIS R 7601-2006.

In this invention, it is preferred that the reinforcing-fiber base material is formed like a sheet. A sheet-like fiber base material is composed of carbon fibers alone or composed of carbon fibers and other inorganic fibers or chemical fibers and the like in combination. As the form of the sheet-like fiber base material, a unidirectional sheet, woven fabric, knitted fabric, braid, mat or the like can be used. Especially since a fiber-reinforced composite material with high mechanical properties and a high volume content of reinforcing fibers can be obtained, a so-called unidirectional woven fabric can be preferably used.

The unidirectional woven fabric can be, for example, a plain weave in which carbon fiber bundles are arranged as warp yarns in parallel to each other in one direction, while fiber bundles of glass fibers or chemical fibers perpendicular to the carbon fiber bundles are arranged as weft yarns in such a manner that the warp yarns and the weft yarns may be crossed over and under each other, or a woven fabric of a non-crimp structure in which warp yarns composed of carbon fiber bundles and auxiliary warp yarns composed of fiber bundles of glass fibers or chemical fibers smaller in fineness than that of the carbon fibers, are arranged in parallel to each other, while weft yarns composed of fiber bundles of glass fibers or chemical fibers are arranged to be perpendicular to the warp yarns and the auxiliary warp yarns, in such a manner that the auxiliary warp yarns and the weft yarns may be crossed over and under each other to integrally hold the carbon fiber bundles, for forming a woven fabric, etc.

In this case, the fineness refers to the weight (g) per 1,000 m of a fiber bundle and is expressed in tex. In this invention, it is preferred that a carbon fiber bundle consists of 6,000 to 70,000 filaments, and that the fineness is in a range from 400 to 5,000 tex, and it is more preferred that a carbon fiber bundle consists of 12,000 to 25,000 filaments, and that the fineness is 800 to 1,800 tex. If the number of carbon fiber filaments and the fineness are smaller than the abovementioned ranges, the number of the crossover points in the woven fabric is too large, and the mechanical properties may decline as the case may be. On the contrary if the number of carbon fiber filaments and the fineness are larger than the abovementioned ranges, the number of the crossover points in the woven fabric is too small, and the dimensional stability and handling properties of the woven fabric may decline as the case may be unpreferably.

In the case of a woven fabric provided as a plain weave, since carbon fiber bundles and weft yarns are crossed over and under each other, the carbon fiber bundles are bent, but in the case of a woven fabric of a non-crimp structure, since auxiliary warp yarns composed of glass fibers or chemical fibers and weft yarns composed of glass fibers or chemical fibers are crossed over and under each other, the carbon fiber bundles are unlikely to be bent. It is preferred that the fineness of the fiber bundles of glass fibers or chemical fibers forming the auxiliary warp yarns is 20% or less of the fineness of the carbon fiber bundles. More preferred is 10% or less. If the fineness of the auxiliary warp yarns is 20% or less of the fineness of the carbon fiber bundles, the auxiliary warp yarns are more likely to be deformed than the carbon fiber bundles, and the woven fabric can be formed without bending the carbon fiber bundles. The lower limit of the fineness of the auxiliary warp yarns is not especially specified, and the smaller the fineness, the better. However, in view of the dimensional stability and production stability of the woven fabric, it is preferred that the fineness is 0.05% or more of the fineness of the carbon fiber bundles. Further, if the fineness of the weft yarns forming the weave is too large, the bending of the carbon fiber bundles may be urged as the case may be. For this reason, it is preferred that the fineness of the fiber bundles of glass fibers or chemical fibers forming the weft yarns is 10% or less of the fineness of the carbon fiber bundles. More preferred is 5% or less. The lower limit of the fineness of the weft yarns is not especially specified, and the smaller the fineness, the better. However, in view of the dimensional stability and production stability of the woven fabric, it is preferred that the fineness is 0.05% or more of the fineness of the carbon fiber bundles.

In the case where the carbon fiber bundles are bent, the volume distribution occupied by the carbon fibers in the fiber bundles becomes irregular, and the carbon fibers may contact each other. In the case where the carbon fibers contact each other, since the portions are not impregnated with the thermosetting resin, they may become defects to lower adhesiveness and mechanical properties. Therefore, a woven fabric of a non-crimp structure in which the carbon fiber bundles are unlikely to be bent can be especially preferably used.

It is preferred that the content of the binder composition in the reinforcing-fiber base material is 5 to 50 $g/m^2$ as weight per unit area. A more preferred range is 7 to 40 $g/m^2$. If the content is smaller than 5 $g/m^2$, the effect of enhancing the toughness between the respective layers formed of the obtained fiber-reinforced composite material becomes small. In the case where the content is larger than 50 $g/m^2$, the thicknesses between the respective layers only become large, to lower the volume content of the carbon fibers in the obtained fiber-reinforced composite material, and in order to exhibit the physical properties required by the member concerned, a thick fiber-reinforced composite material may become necessary as the case may be. As a result, the weight of the member may become large.

The binder composition of this invention may be fusion-bonded to one surface or both surfaces of each layer of the reinforcing-fiber base material, and either can be selectively used as appropriate. As a preferred method for fusion-bonding the binder composition to the surface of the reinforcing-fiber base material, for example, the binder composition is metered by an embossed roll or doctor blade, while it is allowed to naturally drop on the surface of the reinforcing-fiber base material, and is uniformly dispersed using a vibrating net. Then, it is passed through a far infrared heater, to be heated, for achieving the fusion bonding between the binder composition and the reinforcing-fiber base material. As another method, the binder composition can be supplied to a spray nozzle using a metering feeder, so that an air spray may be used to spray the binder composition to the surface of the reinforcing-fiber base material, and subsequently the binder composition and the reinforcing-fiber base material can be passed through a far infrared heater, to be heated and fusion-bonded to each other.

In any of these methods, the binder composition fusion-bonded onto the reinforcing-fiber base material exists like scattered dots, and preferably 80 vol % or more of the binder composition is in a state of being exposed on the reinforcing-fiber base material. Since the binder composition exists like scattered dots, the decline of resin pouring capability in RTM can be inhibited. Further, it is preferred that 80 vol % or more of the binder composition is in a state of being exposed on the reinforcing-fiber base material, for such reasons the binder composition functions like spacers to form an adequate interlayer thickness in the obtained fiber-reinforced composite material, and that the impact from outside can be efficiently absorbed between the respective layers.

Layers formed of the reinforcing-fiber base material are laminated for use as a preform. Especially preferred is a preform in which the binder composition of this invention is made to exist between the layers formed of the reinforcing-fiber base material by applying the binder composition to at least one surface of each layer of the reinforcing-fiber base material. If this constitution is employed, layers formed of the reinforcing-fiber base material can be bonded to each other by the binder composition, and the shape of the reinforcing fiber base can be held. Further, this mode allows free and simple processing into a desired shape and allows lamination at desired fiber axis angles for exhibiting strength, and therefore can be especially suitably used for structural materials of spacecraft, aircraft, rolling stock, motor vehicles, ships, etc.

As the means for obtaining a preform, for example, in the case where the reinforcing-fiber base material has a shape of a three-dimensional braid, it can be used as a preform as it is. Further, in the case where the shape of the reinforcing-fiber base material is a strand, the reinforcing-fiber base material can be wound around a mandrel and heated to bond the overlying regions adjacent to each other of the reinforcing fiber strand, thereby preparing a preform. Furthermore, with regard to a preform in which the binder composition of this invention is made to exist between the respective layers formed of a sheet-like reinforcing-fiber base material by applying the binder composition to at least one surface of each layer of the reinforcing-fiber base material, the sheet-like reinforcing-fiber base material given the binder composition of this invention in advance can be cut to have a predetermined form, and the cut layers can be laminated on a mold and adequately heated and pressurized to obtain the preform. Moreover, in order to form a desired shape as a preform, a method of laying a reinforcing-fiber woven fabric sheet and applying the binder composition of this invention alternately and subsequently applying adequate heat and pressurization can also be employed.

In the case where a preform is prepared by applying a pressure, a press can be used as a means of pressurization, or a method of bagging followed by sucking the inside with a vacuum pump and then by pressurization at atmospheric pressure can also be used. It is preferred that the temperature of heating for preparing a preform is 60 to 150° C. If the heating temperature is lower than 60° C., the respective layers forming the preform may not be sufficiently fixed as the case may be. If the heating temperature is higher than 150° C., the binder composition may excessively collapse to block the passages of the thermoplastic resin, and non-impregnated portions may be formed in the obtained fiber-reinforced composite material as the case may be.

The preform may contain a form core, honeycomb core, metallic part or the like in addition to the reinforcing fibers and the binder composition of this invention.

The preform of this invention can be suitably used for RTM. After the preform is placed in a mold, a liquid thermosetting resin composition can be poured into the mold, to impregnate the preform with the thermosetting resin composition, and the resin can be cured to obtain a fiber-reinforced composite material.

The mold used for RTM can be a rigid closed mold or a rigid open mold together with, a flexible film (bag). In the latter case, the preform can be placed between the rigid open mold and the flexible film.

As the rigid material, various presently available materials such as metals including steel and aluminum, fiber-reinforced plastic (FRP), wood and gypsum can be used. As the materials of the flexible film, nylon, fluorine resin, silicone resin and the like can be used.

In the case where a rigid closed mold is used, after a preform is placed in a cavity formed by the rigid mold, the mold is closed by pressing and subsequently a liquid thermosetting resin composition is poured from the inlet into the cavity with pressurization. In this case, a suction port can also be provided in addition to the inlet, so that a vacuum pump can be connected with the suction port, for sucking the cavity. Further, if suction is performed, the aforementioned thermosetting resin composition can be poured into the cavity using atmospheric pressure only without using any special pressurization means. In this case, it is preferred that the degree of vacuum is −90 kPa or lower. If the degree of vacuum is higher than −90 kPa, voids may be formed in the obtained fiber-reinforced composite material, to lower the mechanical properties as the case may be.

In the case where a rigid open mold and a flexible film are used, a preform is placed on the rigid open mold, and then the flexible film (bag) is used to cover it for sealing, to form a cavity. A vacuum pump is connected with the suction port, to suck and form a vacuum in the cavity (called bagging), and while suction is performed from the suction port, a liquid thermosetting resin composition is poured into the cavity from the inlet using atmospheric pressure. In this case, it is preferred that the degree of vacuum is −90 kPa or lower. If the degree of vacuum is higher than −90 kPa, voids may be formed in the obtained fiber-reinforced composite material, to lower mechanical properties as the case may be. In order to achieve good impregnation by pouring at atmospheric pressure, it is effective to install a resin diffusion medium between the inlet and the preform. Further, before placing the reinforcing-fiber base material or the preform, it is also preferred to coat the rigid mold on the surface with a gel.

The liquid thermosetting resin composition consists of a liquid resin mainly composed of monomer components and a curing agent having an action to three-dimensionally crosslink and curing the monomer components.

As the liquid resin, an epoxy resin is preferred since it is excellent in mechanical properties and in the adhesion to reinforcing fibers. As the epoxy resin, enumerated are bisphenol A diglycidyl ether, bisphenol F diglycidyl ether, tetrabromobisphenol A diglycidyl ether, bisphenol AD diglycidyl ether, 2,2',6,6'-tetramethyl-4,4'-bisphenol diglycidyl ether, N,N,O-triglycidyl-m-aminophenol, N,N,O-triglycidyl-p- aminophenol, N,N,O-triglycidyl-4-amino-3-methylphenol, N,N-diglycidylaniline, N,N-diglycidyl-o-toluidine, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, 1,3-bis (diglycidylaminomethyl)cyclohexane, ethylene glycol diglycidylether, propylene glycol diglycidyl ether, hexamethylene glycol diglycidyl ether, neopentyl glycol diglycidyl ether, sorbitol polyglycidyl ether, glycerol polyglycidyl ether, diglycerol polyglycidyl ether, phthalic acid diglycidyl ester, terephthalic acid diglycidyl ester, vinylcyclohexene diepoxide, 3,4-epoxycyclohexanecarboxylic acid-3,4-epoxycyclohexylmethyl, adipic acid bis-3,4-epoxycyclohexylmethyl, 1,6-dihydroxynaphthalene diglycidyl ether, 9,9-bis(4-hydroxyphenyl)fluorene diglycidyl ether, tris(p-hydroxyphenyl)methane triglycidyl ether, tetrakis(p-hydroxyphenyl) ethane tetraglycidyl ether, phenol novolac glycidyl ether, cresol novolac glycidyl'ether, glycidyl ether of phenol dicyclopentadiene condensation product, phenol aralkyl resin glycidyl ether, triglycidyl isocyanurate, N-glycidyl phthalimide, 5-ethyl-1,3-diglycidyl-5-methylhydantoin, 1,3-glycidyl-5,5-dimethylhydantoin, oxazolidone type epoxy resin obtained by addition of bisphenol A diglycidyl ether and tolylene isocyanate, phenol aralkyl type epoxy, etc. Especially preferred are tri-functional or higher-functional epoxy resins. N,N,N',N'-tetraglycidyl-4,4'-methylenedianiline can be preferably used for such reasons that it has a high effect of enhancing heat resistance and that the cured product thereof has excellent chemicals resistance. Further, N,N,O-triglycidyl-p-aminophenol can be preferably used since it is very low in viscosity among the epoxy resins having an effect of enhancing heat resistance and has an effect of lowering the viscosity of a thermosetting resin composition.

It is preferred that a tri-functional or higher-functional epoxy resin is contained by 40 to 85 mass % based on 100 mass % of all the epoxy resins. A more preferred range is 45 to 75 mass %. If the content of the tri-functional or higher-functional epoxy resin is 40 mass % or more, the glass transition temperature of the obtained cured product or even of the obtained fiber-reinforced composite material can be enhanced. If the content of the tri-functional or higher-functional epoxy resin is 85 mass % or less, the fracture toughness of the cured epoxy resin can be enhanced.

The other preferred epoxy resins than tri-functional or higher-functional epoxy resins include bi-functional epoxy resins such as N,N-diglycidylaniline and N,N-diglycidyl-o-toluidine respectively having a diglycidylaniline structure. They can be preferably used for such reasons that they are low in viscosity and that the free volume in the cured product thereof can be decreased to provide an effect of enhancing the elastic modulus. It is preferred that the content of a bi-functional epoxy resin is 10 to 55 mass % based on 100 mass % of all the epoxy resins. A more preferred range is 15 to 50 mass %. If the content of the bi-functional epoxy resin is 10 mass % or more, the viscosity of the obtained thermosetting resin composition can be lowered, and the elastic modulus of the obtained cured product can be enhanced, the compressive properties of the obtained fiber-reinforced composite material being able to be enhanced. If the content of the bi-functional epoxy resin is 55 mass % or less, the heat resistance and fracture toughness of the obtained cured product can be enhanced.

As the curing agent capable of curing these epoxy resins, enumerated are compounds capable of performing stoichiometric reactions such as aliphatic polyamines, aromatic polyamines, dicyandiamides, polycarboxylic acids, polycarboxylic acid hydrazides, acid anhydrides, polymercaptans and polyphenols and compounds having catalytic actions such as imidazoles, Lewis acid complexes and onium salts. In, the case where a compound capable of performing a stoichiometric reaction is used, a curing accelerator such as an imidazole, Lewis acid complex, onium salt or phosphine may be mixed as the case may be.

In the case where a fiber-reinforced composite material is produced by RTM, an aliphatic polyamine, aromatic polyamine, acid anhydride or imidazole is suitable as the curing agent. Especially in the case where it is intended to produce a structural member excellent in heat resistance, an aromatic polyamine is most suitable, and a liquid aromatic polyamine can be preferably used. As the liquid aromatic polyamine, for example, diethyltoluenediamine (a mixture with 2,4-diethyl-6-methyl-m-phenylenediamine and 4,6-diethyl-2-methyl-m-phenylenediamine as main components), and diaminodiphenylmethane alkyl group derivatives such as 2,2'-diethyl-4,4'-methylenedianiline, 2,2'-isopropyl-6,6'-dimethyl-4,4'-methylenedianiline and 2,2',6,6'-tetraisopropyl-4,4'-methylenedianiline, and polyoxytetramethylene bis (p-aminobenzoate) and the like can be enumerated. Among them, diethyltoluenediamine can be preferably used for such reasons that it is low in viscosity and that the obtained cured product is excellent in such physical properties as glass transition temperature.

The liquid aromatic polyamine can be mixed with a solid aromatic polyamide to such an extent that crystals are not precipitated. As the solid aromatic polyamine, 3,3'-diaminodiphenylsulfone and 4,4'-diaminodiphenylsulfone can be preferably used for such reasons that a cured product excellent in heat resistance and elastic modulus can be obtained and that the declines of the linear expansion coefficient and of the heat resistance due to moisture absorption are small. In general, diaminodiphenylsulfone is strong in crystallinity, and even if it is mixed with a liquid aromatic polyamine at high temperature to make a liquid, it is likely to be precipitated as crystals in the process of cooling, and it is preferred to mix two diaminodiphenylsulfone isomers and a liquid aromatic polyamine, for such reasons that the precipitation of crystals can be more inhibited than that by a mixture consisting of one diaminodiphenylsulfone isomer and a liquid aromatic polyamine, and that the content of diaminodiphenylsulfone can be kept large. It is preferred that the content of diaminodiphenylsulfone is 10 to 40 mass % based on 100 mass % of all the aromatic amines, and a more preferred range is 20 to 35 mass %. If the content is 10 mass % or more, the aforementioned effects of the cured product are likely to be obtained, and it is preferred that the content is 40 mass % or less, since the precipitation of crystals is likely to be inhibited. In the case where 3,3'-diaminodiphenylsulfone and 4,4'-diaminodiphenylsulfone are used together for inhibiting the precipitation of crystals, it is preferred that the mass ratio of both is in a range from 10:90 to 90:10, and if the rates of both are closer to each other, the effect of inhibiting the precipitation of crystals is higher.

In the case where a polyamine-based curing agent is used, it is preferred that the mixed amounts of the epoxy resins and the curing agent are such that the number of active hydrogen atoms in the curing agent is in a range from 0.7 to 1.3 based on each epoxy group contained in all the epoxy resins. A more preferred range is 0.8 to 1.2. In this case, an active hydrogen atom refers to a highly reactive hydrogen atom bound to nitrogen, oxygen or sulfur in an organic compound. In the case where the ratio between epoxy groups and active hydrogen atoms does not fall in the aforementioned range, the heat resistance and the elastic modulus of the obtained cured resin may decline.

In the case where an aromatic polyamine is used as the curing agent, it is known that the aromatic polyamine is generally slow in the progress of crosslinking reaction, and therefore a curing accelerator can also be mixed for accelerating the reaction. As the curing accelerator, for example, such a curing accelerator as a tertiary amine, Lewis acid complex, onium salt, imidazole or phenol compound can be used.

In the case where RTM is used for producing a fiber-reinforced composite material, it is preferred to inhibit the increase of viscosity while the liquid thermosetting resin composition is poured. T-butylcatechol has such features as being low in the effect of accelerating curing at the temperature (50 to 80° C.) at which the resin composition is poured, and increasing the effect of accelerating curing in the temperature range of 100° C. and higher, and therefore is suitable for RTM.

In the case where a curing accelerator is mixed, it is preferred that the content of the curing accelerator is 0.1 to 10 parts by Mass based on 100 parts by mass of all the epoxy resins. A more preferred range is 0.5 to 5 parts by mass, and a further more preferred range is 1 to 2.5 parts by mass. It is not preferred that the content of the curing accelerator does not fall in this range since the balance between the handling time in the non-cured state and the reaction rate at high temperature collapses.

When the viscosity of a liquid thermosetting resin composition is measured at 70° C., it is preferred that the viscosity within 5 minutes after start of measurement is 300 mPa·s or less. More preferred is 200 mPa·s or less. Meanwhile, the viscosity is measured according to "Viscosity Measuring Method by a Cone-Plate Type Rotational Viscometer" of JIS Z 8803 (1991) using an E-type viscometer (TVE-30H produced by Toki Sangyo Co., Ltd.) equipped with a standard cone rotor (1° 34'×R24) at a rotational speed of 50 rpm. If the viscosity within 5 minutes after start of measurement is higher than the abovementioned range, the impregnability with the thermosetting resin composition may be insufficient. The lower limit of the viscosity at 70° C. is not especially specified, but in RTM, if the viscosity is lower, the pouring of and the impregnation with the thermosetting resin composition are easier.

The pouring of and impregnation with the liquid thermosetting resin composition are followed by heating and curing at a temperature in a range from 50 to 200° C. for a time period in a range from 0.5 to 10 hours. The heating can be accomplished in one step or performed under a combination of multiple conditions in multiple steps. If the temperature is higher, the heat resistance of the fiber-reinforced composite material can be higher. However, a higher temperature is less economical for such reasons that the costs of equipment, heat source and the like become higher and that the mold occupation time becomes longer. Consequently it is preferred that the initial curing is performed at a temperature in a range from 50 to 140° C., preferably at a temperature of approx. 130° C., and that after the molded article is released from the mold, final curing is performed at a higher temperature using such an apparatus as an oven.

In the case where a structural member for aircraft is supposed, if curing is performed, for example, at a temperature in a range from 160 to 180° for a time period in a range from 1 to 10 hours as final curing conditions, a desired fiber-reinforced composite material can be obtained.

In the fiber-reinforced composite material, it is preferred that the volume content (Vf) of the reinforcing fibers is 50 to 65%, and a more preferred range is 53 to 60%. If the volume content of the reinforcing fibers is 50% or more, the fiber-reinforced composite material becomes light in weight and can be suitably used for an aircraft member, etc. Further, since stress concentration is unlikely to occur, the strength becomes high. Further, it is preferred that the volume content of the reinforcing fibers is 65% or less, since defective portions such as non-impregnated portions and voids are unlikely to be formed inside the fiber-reinforced composite material.

The fiber-reinforced composite material of this invention having a binder composition between respective layers is excellent in impact resistance against the impacts from outside, and especially has a high compression-after-impact (CAI) strength. In order that the fiber-reinforced composite material can be used as a structural member for aircraft, it is preferred that the CAI strength is 230 MPa or more. More preferred is 240 MPa or more. Meanwhile, for measuring the CAI strength of the fiber-reinforced composite material, a falling weight impact of 6.76 J per 1 mm thickness of a specimen is given to the specimen according to JIS K 7089 (1996), and subsequently the CAI strength is measured according to JIS K 7089 (1996). If the CAI strength is lower than 230 MPa, the laminate thickness is required to be thicker for use as a structural member, and accordingly the weight increases. The increase of weight is not preferred since the fuel consumption of aircraft increases.

This invention is especially suitable for RTM, but can also be suitably used for other molding methods than RTM. For example, in the case where the reinforcing-fiber base material of this invention has a shape of a strand or tape, this invention is also suitable for the filament winding method, pultrusion method, prepreg method, etc. Further, in the case where the reinforcing-fiber base material of this invention has a shape of a sheet, this invention is suitable also for the hand layup method; prepreg method, etc.

Since the binder composition of this invention is insoluble in thermosetting resins, especially epoxy resins used as the matrix resin of the fiber-reinforced composite material, it does not undergo the changes of mechanical properties caused by the changes of molding conditions, especially changes of temperature and heating rate, and can enhance the productivity of the fiber-reinforced composite material.

Further, the fiber-reinforced composite material produced by using the binder composition of this invention can be light in weight and has excellent resistance against the impacts from outside, and therefore can be suitably used for many structural members including aircraft members such as fuselages, main wings, tail assemblies, moving blades, fairings, cowls, doors, seats and interior materials; spacecraft members such as motor cases and main wings; artificial satellite members such as body structures and antennas; motor vehicle members such as outside plates, chassis, aerodynamic members and seats; rolling stock members such as body structures and seats; and ship members such as hulls and seats.

EXAMPLES

This invention is explained below more specifically in reference to examples. Meanwhile, the "parts" used as units of chemical composition rates mean parts by mass unless otherwise stated.

[Production of a Reinforcing-Fiber Woven Fabric Composed of Carbon Fibers]

The reinforcing-fiber woven fabric used in the examples was prepared as described below. Carbon fiber bundles "Torayca" (registered trademark) T800S-24K-10E (PAN-based carbon fibers produced by Toray Industries, Inc., 24,000 filaments, fineness 1,033 tex, tensile modulus 294 GPa) were paralleled at a density of 1.8 bundles/cm as warp yarns, and glass fiber bundles ECDE-75-1/0-1 OZ (produced by Nitto Boseki Co., Ltd., 800 filaments, fineness 67.5 tex) were paralleled at a density of 1.8 bundles/cm as auxiliary warp yarns in parallel to the carbon fiber bundles, the glass fiber bundles and the carbon fiber bundles being arranged alternately, to form a unidirectional sheet-like group of reinforcing-fiber bundles. As weft yarns, glass fiber bundles E-glass Yarn ECE-225-1/0-1 OZ (produced by Nitto Boseki Co., Ltd., 200 filaments, fineness 22.5 tex) were arranged at a density of 3 bundles/cm in the direction perpendicular to the aforementioned unidirectional sheet-like group of reinforcing-fiber bundles. The auxiliary warp yarns and the weft yarns were woven to be crossed over and under each other using a loom, to prepare a unidirectional non-crimp woven fabric in which the carbon fibers were substantially arranged in one direction without crimp. Meanwhile, the rate of the fineness of the weft yarns to the fineness of the carbon fiber bundles in the obtained reinforcing-fiber woven fabric was 2.2%, and the rate of the fineness of the auxiliary warp yarns was 6.5%. The weight per unit area of the carbon fibers was 192 g/m$^2$.

[Preparation of a Liquid Thermosetting Resin Composition]

The thermosetting resin composition used in the examples was a two-pack type amine-curable epoxy resin, and it was prepared as described below.

Fifty parts of "Araldite" (registered trademark) MY721 (produced by Huntsman Japan K.K., ingredient . . . N,N,N', N'-tetraglycidyl-4,4'-methylenedianiline) and 50 parts of GAN (produced by Nippon Kayaku Co., Ltd., ingredient N,N-diglycidylaniline) were mixed at a temperature of 70° C., to make a main agent. The viscosity of the main agent at 70° C. was 61 mPa·s.

Separately from the main agent, 29.3 parts of "jER Cure" (registered trademark) W (produced by Mitsubishi Chemical Corp., ingredient . . . diethyltoluenediamine), 6.3 parts of 3,3'-DAS (produced by Konishi Chemical Ind. Co., Ltd., ingredient 3,3'-diaminodiphenylsulfone) and 6.3 parts of "SEIKACURE" (registered trademark) (produced by Seika K.K., ingredient 4,4'-diaminodiphenylsulfone) were mixed with stirring at temperature of 130° C., and when the state where there remained no solid anymore was reached, the mixture was cooled to a temperature of 70° C. The, 1.5 parts of DIC-TBC (produced by DIC K.K., ingredient . . . 4-t-butylcatechol) were added, and the mixture was stirred further at a temperature of 70° C., till the state where there remained no solid any more was reached, to make a curing agent. The viscosity of the curing agent at 70° C. was 81 mPa·s.

Forty three point four parts of the aforementioned curing agent were mixed with 100 parts of the aforementioned main agent, to obtain a liquid thermosetting resin composition. The viscosity measured 5 minutes after start of mixing at 70° was 68 mPa·s.

[Measurement of Viscosity]

The viscosity was measured according to "Viscosity Measuring Method by a Cone-Plate Type Rotational Viscometer" equipped with a standard cone rotor (1° 34'×R24) of JIS Z 8803 (1991) using an E-type viscometer (TVE-30H produced by Toki Sangyo Co., Ltd.) at a rotational speed of 50 rpm and at a predetermined temperature.

[Measurement of the Volume Average Particle Size of a Binder Composition]

The binder composition obtained in each example was measured using a laser diffraction/scattering particle size distribution measuring apparatus, Partica LA-950V2 (produced by Horiba, Ltd.) at a capture frequency of 15 times according to JIS Z 8825-1 (2001).

[Measurement of Glass Transition Temperature]

The amorphous polyamide as the component [A] used in each example and the binder composition obtained in each example were sampled by 5 to 10 mg respectively, and the intermediate glass transition temperature ($T_{mg}$) was measured according to JIS K 7121 (1987). For measurement, differential scanning calorimeter DSC Q2000 (produced by TA Instruments) was used. The number of samples was two, and the mean value was obtained.

[Measurement of the Compression-after-Impact Strength of a Fiber-Reinforced Composite Material]

From each obtained fiber-reinforced composite material, rectangular specimens of 150 mm length and 100 mm width were cut out with the longitudinal direction of each specimen as the carbon fiber orientation angle of 0 degrees. At the center of each rectangular specimen, a falling weight impact of 6.76 J per 1 mm thickness of the specimen was applied according to JIS K 7089 (1996), and the residual compressive strength (CAI strength) was measured according to JIS K 7089 (1996). The number of specimens was five, and the mean value was obtained.

[Measurement of the Volume Content (Vf) of the Reinforcing Fibers in a Fiber-Reinforced Composite Material]

Samples each with a mass of 0.2 to 0.5 g were cut out from the fiber-reinforced composite material obtained in each example, and Vf was measured by the nitric acid decomposition method described in JIS K 7075 (1991). The number of samples was five, and the mean value was obtained.

Example 1

(Preparation of Binder Composition (1))

Seventy parts of "Grilamid" (registered trademark) TR55 (produced by EMS-CHEMIE (Japan) Ltd., glass transition temperature 160° C.) as an amorphous polyamide having 3,3'-dimethyl-4,4'-diaminodicyclohexylmethane skeleton and 30 parts of "TOPCIZER" (registered trademark) 5-go (produced by Fuji Amide Chemical Co., Ltd., ingredient . . . o/p-toluenesulfonamide) were kneaded using a twin-screw extruder at a temperature of 180° C., to obtain pellets. The obtained pellets were freeze-ground by a hammer mill (PULVERIZER produced by Hosokawa Micron Corporation; hereinafter this applies also to the following examples and comparative examples) using liquid nitrogen, to obtain binder a composition (1) as particles. The obtained binder composition (1) had a volume average particle size of 86 µm and a glass transition temperature of 70° C.

Ten parts of the obtained binder composition (1) and 100 parts of the aforementioned main agent were mixed, and the mixture was stirred at a temperature of 180° C. for 1 hour and then cooled to 70° C. An adequate amount was taken from the obtained mixture onto a slide glass and observed at a magnification of 5× using light-field optical microscope, and a solid with particle sizes of 50 µm or larger was found to remain. The solid was filtered away using gauze, and subsequently the viscosity of the filtrate at 70° C. was measured and found to be 246 mPa·s. The viscosity of the filtrate was 4.0 times the viscosity of the main agent in conformity with the condition (II).

(Preparation of Reinforcing-Fiber Base Material (1))

The obtained binder composition (1) was metered by an embossed roll and a doctor blade while being allowed to naturally fall on one surface of the aforementioned reinforcing-fiber woven fabric composed of carbon fibers, and was uniformly dispersed using a vibrating net, while being scattered to achieve a weight per unit area of 25 g/m$^2$. Then, the reinforcing-fiber woven fabric was passed through a far infrared heater at a temperature of 160° C. and at a speed of 0.3 m/min, to have the binder composition (1) fusion-bonded thereto, thereby obtaining a reinforcing-fiber base material (1) having the binder composition (1) on one surface thereof.

(Preparation of Preform (1))

The obtained reinforcing-fiber base material (1) was cut into a predetermined size, and four layers formed of the reinforcing-fiber base material (1) were laminated in such a manner that the respectively adjacent layers might be shifted by 45 degrees like [+45°/0°/−45°/90°] respectively in the longitudinal direction of the carbon fibers, this operation being performed repetitively three times to obtain a laminate consisting of 12 layers in total. Then, two such 12-layer laminates were laminated symmetrically in such a manner that the 90-degree layers might face each other, to obtain a laminate consisting of 24 layers in total. The obtained laminate was placed on the surface of a flat mold made of aluminum and hermetically covered with a bag material (a polyamide film) and a sealant. The cavity formed by the mold and the bag material was evacuated to form a vacuum, and the mold was then moved into a hot air dryer and heated at a rate of 3° C./min from room temperature to a temperature of 80° C., then being heated at a temperature of 80° C. for 1 hour. Subsequently, while the vacuum state was kept in the cavity, cooling to lower than 60° was performed in atmospheric air, and then the cavity was opened to atmospheric air, to obtain a preform (1).

(Molding of Fiber-Reinforced Composite Material (1a): Example 1-1)

The obtained preform (1) was placed on the surface of a flat mold made of aluminum, and on it, a polyester fabric treated for allowing release as a peel ply and a knitted fabric made of polypropylene as a resin diffusion medium were placed in this order. On them, a bag material and a sealant were used for achieving hermetic sealing to form a cavity except that a resin inlet and a pressure-reducing suction port were formed. The cavity was sucked by a vacuum pump from the pressure-reducing suction port, to adjust the degree of vacuum to −90 kPa or less, and subsequently the mold and the preform were adjusted to a temperature of 70° C. For the temperature adjustment, a hot air dryer was used.

Separately, as the main agent and the curing agent of the aforementioned liquid thermosetting resin composition, 43.4 parts of the curing agent were mixed with 100 parts of the main agent, to prepare a liquid thermosetting resin composition. The liquid thermosetting resin composition was preliminarily heated at a temperature of 70° C. for 30 minutes and subjected to vacuum degassing treatment.

The liquid thermosetting resin composition subjected to preliminary heating and degassing treatment was set in the resin inlet of the mold, and poured into the cavity forming a vacuum using the pressure difference between the pressure in the cavity and the atmospheric pressure, to impregnate the preform (1) with it. When the liquid thermosetting resin composition reached the pressure-reducing suction port, the resin inlet was closed, and while the suction from the pressure-reducing suction port was continued, the state was held for 1 hour. Then, the pressure-reducing suction port was closed.

Subsequently, heating at a rate of 1.5° C./min up to a temperature of 140° C. was followed by preliminary curing at a temperature of 140° C. for 2 hours. The preliminarily cured product was discharged from the mold, and the respective subsidiary materials such as the peel ply were removed. Then, heating at a rate of 1.5° C./min up to a temperature of 180° C. in a hot air dryer was followed by curing at a temperature of 180° C. for 2 hours, to obtain a fiber-reinforced composite material (1a). The volume content of the carbon fibers of the obtained fiber-reinforced composite material (1a) was 56%.

(Molding of Fiber-Reinforced Composite Material (1B): Example 1-2)

A liquid thermosetting resin composition was poured according to the same procedure as that of the aforementioned (Molding of fiber-reinforced composite material (1a)), except that an aluminum net was used as the resin diffusion medium. When the liquid thermoplastic resin composition reached the pressure-reducing suction port, the resin inlet was closed, and while the suction from the pressure-reducing suction port was continued, the state was held for 1 hour. Then, the pressure-reducing suction port was closed.

Subsequently, heating at a rate of 1.5° C./min up to a temperature of 180° was followed by curing at a temperature of 180° C. for 2 hours. The cured product was discharged from the mold, and the respective subsidiary materials such as the peel ply were removed to obtain a fiber-reinforced composite material (1b). The volume content of the carbon fibers of the obtained fiber-reinforced composite material (1b) was 58%.

(Compression-after-Impact (CAI) strengths of Fiber-Reinforced Composite Materials (1a) and (1b))

From the obtained fiber-reinforced composite materials, specimens were prepared by the aforementioned method, and the CAI strengths were measured. As a result, the fiber-reinforced composite material (1a) had a high CAI strength of 275 MPa, and the fiber-reinforced composite material (1b) had a high CAI strength of 290 MPa. Though the molding temperatures were different, both the composite materials had high CAI strengths, being suitable as structural members for aircraft requiring high mechanical properties and quality.

Example 2

(Preparation of Binder Composition (2))

Seventy parts of "Grilamid" (registered trademark) TR90 (produced by EMS-CHEMIE (Japan) ltd., glass transition temperature 155° C.) as an amorphous polyamide having 3,3'-dimethyl-4,4'-diaminodicyclohexylmethane skeleton and 30 parts of "TOPCIZER" (registered trademark) 1-go S (produced by Fuji Amide Chemical Co., Ltd., ingredient . . . p-toluenesulfonamide) were kneaded and freeze-ground according to the same procedure as that of Example 1, to obtain a binder composition (2). The obtained binder composition (2) had a volume average particle size of 92 μm and a glass transition temperature of 64° C.

Ten parts of the obtained binder composition (2) and 100 parts of the aforementioned main agent were mixed, and the mixture was stirred at a temperature of 180° C. for 1 hour and then cooled to 70° C. An adequate amount was taken from the obtained mixture onto a slide glass and observed at a magnification of 5× using a light-field optical microscope, and a solid with particle sizes of 50 μm or larger was found to remain. The solid was filtered away using gauze, and subsequently the viscosity of the filtrate at 70° C. was measured and found to be 235 mPa·. The viscosity of the filtrate was 3.9 times the viscosity of the main agent in conformity with the condition (II).

(Preparation of Reinforcing-Fiber Base Material (2))

A reinforcing-fiber base material (2) having the binder composition (2) was obtained according to the same procedure as that of Example 1, except that the obtained binder composition (2) was used.

(Preparation of Preform (2))

A preform (2) was obtained according to the same procedure as that of Example 1, except that the obtained reinforcing-fiber base material (2) was used.

(Molding of Fiber-Reinforced Composite Material (2))

A fiber-reinforced composite material (2) was obtained according to the same procedure as that of (Molding of fiber-reinforced composite material (1a)) of Example 1. The volume content of the carbon fibers of the obtained fiber-reinforced composite material (2) was 57%. The CAI strength was measured as described in Example 1, and found to be as high as 276 MPa, and the fiber-reinforced composite material (2) was suitable as a structural member for aircraft.

Example 3

(Preparation of Binder Composition (3))

Sixty parts of "Grilamid" (registered trademark) TR90 (produced by EMS-CHEMIE (Japan) Ltd., glass transition temperature 155° C.) as an amorphous polyamide having 3,3'-dimethyl-4,4'-diaminodicyclohexylmethane skeleton and 40 parts of EBSA (produced by Fuji Amide Chemical Co., Ltd, ingredient . . . p-ethylbenzenesulfonamide) were kneaded and freeze-ground according to the same procedure as that of Example 1, to obtain a binder composition (3). The obtained binder composition (3) had a volume average particle size of 88 μm and a glass transition temperature of 65° C.

Ten parts of the obtained binder composition (3) and 100 parts of the aforementioned main agent were mixed, and the mixture was stirred at a temperature of 180° C. for 1 hour and then cooled to 70° C. An adequate amount was taken from the obtained mixture onto a slide glass and observed at a magnification of 5× using a light-field optical microscope, and a solid with particle sizes of 50 μm or larger was found to remain. The solid was filtered away by gauze, and the viscosity of the filtrate at 70° C. was measured and found to be 222 mPa·s. The viscosity of the filtrate was 3.6 times the viscosity of the main agent in conformity with the condition (II).

(Preparation of Reinforcing-Fiber Base Material (3))

A reinforcing-fiber base material (3) having the binder composition (3) was obtained according to the same procedure as that of Example 1, except that the obtained binder composition (3) was used.

(Preparation of Preform (3))

A preform (3) was obtained according to the same procedure as that of Example 1, except that the obtained reinforcing-fiber base material (3) was used.

(Molding of Fiber-Reinforced Composite Material (3))

A fiber-reinforced composite material (3) was obtained according to the same procedure as that of (Molding of fiber-reinforced composite material (1a)) of Example 1, except that the obtained preform (3) was used.

The volume content of the carbon fibers of the obtained fiber-reinforced composite material (3) was 57%. The CAI strength was measured as described in Example 1, and as a result, found to be as high as 266 MPa. The fiber-reinforced composite material (3) was suitable as a structural member for aircraft.

Example 4

(Preparation of Binder Composition (4)

Fifty five parts of "Grilamid" (registered trademark) TR90 (produced by EMS-CHEMIE (Japan) Ltd., glass transition temperature 155° C.) as an amorphous polyamide having 3,3'-dimethyl-4,4'-diaminodicyclohexylmethane skeleton, 30 parts of "TOPCIZER" (registered trademark) 1-go S (Fuji Amide Chemical, Co., Ltd., ingredient . . . p-toluenesulfonamide), and 15 parts of TPAE-8 (produced by Fuji Kasei Kogyo K. K., ingredient . . . polymerized fatty acid-based polyamide elastomer) were kneaded and freeze-ground according to the same procedure as that of Example 1, to obtain a binder composition (4). The obtained binder composition (4) had a volume average particle size of 85 μm and a glass transition temperature of 67° C.

Ten parts of the obtained binder composition (4) and 100 parts of the aforementioned main agent were mixed, and the mixture was stirred at a temperature of 180° C. for 1 hour and then cooled to 70° C. An adequate amount was taken from the obtained mixture onto a slide glass and observed at a magnification of 5× using a light-field optical microscope. A solid with particle sizes of 50 μm or larger was found to remain. The solid was filtered away using gauze, and subsequently the viscosity of the filtrate at 70° C. was measured and found to be 256 mPa·s. The viscosity of the filtrate was 4.2 times the viscosity of the main agent in conformity with the condition (II).

(Preparation of Reinforcing-Fiber Base Material (4))

A reinforcing-fiber base material (4) having the binder composition (4) was obtained according to the same procedure as that of Example 1, except that the obtained binder composition (4) was used.

(Preparation of Preform (4))

A preform (4) was obtained according to the same procedure as that of Example 1, except that the obtained reinforcing-fiber base material (4) was used.

(Molding of Fiber-Reinforced Composite Material (4))

A fiber-reinforced composite material (4) was obtained according to the same procedure as that of (Molding of fiber-reinforced composite material (1a)) of Example 1. The volume content of the carbon fibers of the obtained fiber-reinforced composite material (3) was 57%. The CAI strength was measured as described in Example 1, and as a result found to be as high as 281 MPa. The fiber-reinforced composite material was suitable as a structural member for aircraft.

Example 5

Preparation of Binder Composition (4))

Seventy parts of "Grilamid" (registered trademark) TR90 (produced by EMS-CHEMIE (Japan) Ltd., glass transition temperature 155° C.) as an amorphous polyamide having 3,3'-dimethyl-4,4'-diaminodicyclohexylmethane skeleton, 25 parts of "TOPCIZER" (registered trademark) 1-go S (produced by Fuji Amide Chemical Co., Ltd., ingredient . . . p-toluenesulfonamide) and 5 parts of "PANDEX" (registered trademark) (produced by DIC Bayer Polymer Ltd., ingredient . . . urethane-based elastomer) were kneaded and freeze-ground according to the same procedure as that of Example 1, to obtain a binder composition (5). The obtained binder composition had a volume average particle size of 82 μm and a glass transition temperature of 74° C.

Ten parts of the obtained binder composition and 100 parts of the aforementioned main agent were mixed, and the mixture was stirred at a temperature of 180° C. for 1 hour and then cooled to a temperature of 70° C. An adequate amount was taken from the obtained mixture onto a slide glass and observed at a magnification of 5× using a light-field optical microscope. A solid with particle sizes of 50 μm or larger was found to remain. The solid was filtered away using gauze, and subsequently the viscosity of the filtrate at 70° C. was measured and found to be 242 mP·s. The viscosity of the filtrate was 4.0 times the viscosity of the main agent in conformity with the condition (II).

(Preparation of Reinforcing-Fiber Base Material (5))

A reinforcing-fiber base material (5) having the binder composition (5) was obtained according the same procedure as that of Example 1, except that the obtained binder composition (5) was used.

(Preparation of Preform (5))

A preform (5) was obtained according to the same procedure as that of Example 1, except that the obtained reinforcing-fiber base material (5) was used.

(Molding of Fiber-Reinforced Composite Material (5))

A fiber-reinforced composite material (5) was obtained according to the same procedure as that of (Molding of fiber-reinforced composite material (1a)) of Example 1. The volume content of the carbon fibers of the obtained fiber-reinforced composite material (3) was 56%. The CAI strength was measured as described in Example 1 and as a result found to be as high as 277 MPa. The fiber-reinforced composite material (5) was suitable as a structural member for aircraft.

Comparative Example 1

(Preparation of Binder Composition (6))

Sixty parts of "SUMIKAEXCEL" (registered trademark) PES5003P (produced by Sumitomo Chemical. Co., Ltd., glass transition temperature 277° C.) as an amorphous polyethersulfone soluble in an epoxy resin and 40 parts of AK-601 (produced by Nippon Kayaku Co., Ltd., ingredient . . . hexahydrophthalic acid diglycidyl ester) were kneaded at a temperature of 210° C. using a twin-screw extruder, to obtain pellets. The obtained pellets were freeze-ground according to the same procedure as that of Example 1, to obtain a binder composition (6) as particles. The obtained composition (6) had a volume average particle size of 90 μm and a glass transition temperature of 68° C.

Ten parts of the obtained binder composition (6) and 100 parts of the aforementioned main agent were mixed, and the mixture was stirred at a temperature of 180° C. for 1 hour and then cooled to 70° C. An adequate amount was taken from the obtained mixture onto a slide glass and observed at magnifications of 5× and 40× using a light-field optical microscope, and no solid was confirmed. The viscosity of the mixture at 70° C. was measured and found to be 600 mPa·s. The viscosity of the mixture was 9.8 times the viscosity of the main agent not in conformity with the condition (II).

(Preparation of Reinforcing-Fiber Base Material (6))

A reinforcing-fiber base material (6) having the binder composition (6) was obtained according to the same procedure as that of Example 1, except that the obtained binder composition (6) was used.

(Preparation of Preform (6))

A preform (6) was obtained according to the same procedure as that of Example 1, except that the obtained reinforcing-fiber base material (6) was used.

(Molding of Fiber-Reinforced Composite Material (6a): Comparative Example 1-1)

A fiber-reinforced composite material (6a) was obtained according to the same procedure as that of (Molding of fiber-reinforced composite material (1a): Example 1-1) of Example 1. The volume content of the carbon fibers of the obtained fiber-reinforced composite material (6a) was 56%.

(Molding of Fiber-Reinforced Composite Material (6b): Comparative Example 1-2)

A fiber-reinforced composite material (6b) was obtained according to the same procedure as that f (Molding of fiber-reinforced composite material (1b): Example 1-2) of Example 1, except that the obtained preform (6) was used. The volume content of the carbon fibers of the obtained fiber-reinforced composite material (6b) was 61%.

(Compression-after-Impact (CAI) Strengths of Fiber-Reinforced Composite Materials (6a) and (6b))

The CAI strengths were measured as described in Example 1. As a result, the CAI strength of the fiber-reinforced composite material (6a) was as high as 250 MPa, but that of the fiber-reinforced composite material (6b) was as low as 195 MPa. Since the molding temperature was changed, the solubility of the binder composition was changed to change the CAI strength. Therefore, the fiber-reinforced composite material (6b) was unsuitable as a structural member for aircraft requiring high mechanical properties and quality.

Comparative Example 2

(Binder Composition (7))

A nonwoven fabric of nylon 12 (melting point 176° C., glass transition temperature 50° C.) as a crystalline polyamide was used. The weight per unit area of the used nylon 12 nonwoven fabric was 10 g/m$^2$.

Ten parts of the nylon 12 nonwoven fabric and 100 parts of the aforementioned main agent were mixed, and the mixture was stirred at a temperature of 180° C. for 1 hour and then cooled to 70° C. An adequate amount was taken from the obtained mixture onto a slide glass and observed at a magnification of 5× using a light-field optical microscope, and a solid formed like a nonwoven fabric was found to remain. The solid was filtered away using gauze, and subsequently the viscosity of the filtrate at 70° C. was measured and found to be 85 mPa·s. The viscosity of the filtrate was 1.4 times the viscosity of the main agent in conformity with the condition (II).

(Preparation of Laminate (7))

The aforementioned reinforcing-fiber woven fabric and the nylon 12 nonwoven fabric were out into a predetermined size, and four sets, each set consisting of one reinforcing-fiber woven fabric sheet and one nylon 12 nonwoven fabric sheet, were laminated in such a manner that the respectively adjacent layers might be shifted by 45 degrees like [+45°/0°/−45°/90°] respectively in the longitudinal direction of the carbon fibers, this operation being performed repetitively three times to obtain a laminate consisting of 12 layers in total- and having each nylon 12 nonwoven fabric sheet disposed between the respectively adjacent layers. Then, two such 12-layer laminates were laminated symmetrically in such a manner that the 90-degree layers might face each other, to obtain a laminate (7) consisting of 24 reinforcing-fiber woven fabric layers in total, having each nylon 12 nonwoven fabric sheet disposed between the respectively adjacent layers.

(Molding of Fiber-Reinforced Composite Material (7))

The obtained laminate (7) was placed on the surface of a flat mold made of aluminum in such a manner that the laminate (7) might not collapse, and then a fiber-reinforced composite (7) was obtained according to the same procedure as that of (Molding of fiber-reinforced composite material (1a)) of Example 1. The volume content of the carbon fibers of the obtained fiber-reinforced composite material (7) was 53%. The CAI strength was measured as described in Example 1, and as a result, found to be as low as 190 MPa. The fiber-reinforced composite material (7) was unsuitable as a structural member for aircraft requiring high mechanical properties and quality.

Example 6

(Preparation of Binder Composition (8))

Thirty five parts of "Grilamid" (registered trademark) TR55 (produced by EMS-CHEMIE (Japan) Ltd., glass transition temperature 160° C.) as an amorphous polyamide having 3,3'-dimethyl-4,4'-diaminodicyclohexylmethane skeleton and 65 parts of "TOPCIZER" (registered trademark) 1-go S (produced by Fuji Amide Chemical Co., Ltd., ingredient . . . p-toluenesulfonamide) were kneaded and freeze-ground according to the same procedure as that of Example 1, to obtain a binder composition (8). The obtained binder composition (8) had a volume average particle size of 112 μm and a glass transition temperature of, 52° C.

Ten parts of the obtained binder composition (8) and 100 parts of the aforementioned main agent were mixed, and the mixture was stirred at a temperature of 180° C. for 1 hour and then cooled to 70° C. An adequate amount was taken from the obtained mixture onto a slide glass and observed at a magnification of 5× using a light-field optical microscope. A solid was found to remain and to have particle sizes of 10 μm and smaller. The solid was filtered away using gauze, and subsequently the viscosity of the filtrate at 70° C. was measured and found to be 427 mPa·s. The viscosity of the filtrate was 7.0 times the viscosity of the main agent not in conformity with the condition (II).

(Preparation of Reinforcing-Fiber Base Material (8))

A reinforcing-fiber base material (8) having the binder composition (8) was obtained according to the same procedure as that of Example 1, except that the obtained binder composition (8) was used.

(Preparation of Preform (8))

A preform (8) was obtained according to the same procedure as that of Example 1, except that the obtained reinforcing-fiber base material (8) was used.

(Molding of Fiber-Reinforced Composite Material (8))

A fiber-reinforced composite material (8) was obtained according to the same procedure as that of (Molding of fiber-reinforced composite material (1a)) of Example 1. The volume content of the carbon fibers of the obtained fiber-reinforced composite material (8) was 53%. The CAI strength was measured as described in Example 1 was measured and as a result found to be 221 MPa.

Example 7

(Preparation of Binder Composition (9))

Ten parts of "Grilamid" (registered trademark) TR90 (produced by EMS-CHEMIE (Japan) Ltd., glass transition temperature 155° C.) as an amorphous polyamide having 3,3'-dimethyl-4,4'-diaminodicyclohexylmethane skeleton, 50 parts of "TOPCIZER" (registered trademark) 1-go S (produced by Fuji Amide Chemical Co., Ltd., ingredient . . . p-toluenesulfonamide) and 40 parts of TPAE-8 (produced by Fuji Kasei Kogyo K.K., ingredient . . . polymerized fatty acid-based polyamide elastomer) were kneaded and freeze-ground according to the same procedure as that of Example 1, to obtain a binder composition (9). The obtained binder composition (9) had a volume average particle size of 120 μm and a low glass transition temperature of 38° C.

Ten parts of the obtained binder composition (9) and 100 parts of the aforementioned main agent were mixed, and the mixture was stirred at a temperature of 180° C. for 1 hour and then cooled to a temperature of 70° C. An adequate amount was taken from the obtained mixture onto a slide glass and observed at a magnification of 5× using a light-field optical microscope. No solid was confirmed. The viscosity of the mixture at 70° C. was measured and found to be 586 mPa·s. The viscosity of the mixture was 9.6 times the viscosity of the main agent not in conformity with the condition (II).

(Preparation of Reinforcing-Fiber Base Material (9))

A reinforcing-fiber base material (9) having the binder composition (9) was obtained according to the same procedure as that of, Example 1, except that the obtained binder composition (9) was used.

(Preparation of Preform (9))

A preform (9) was obtained according to the same procedure as that of Example 1, except that the obtained reinforcing-fiber base (9) was used.

(Molding of Fiber-Reinforced Composite Material (9))

A fiber-reinforced composite material (9) was obtained according to the same procedure as that of (Molding of fiber-reinforced composite material (1a)) of Example 1. The volume content of the carbon fibers of the obtained fiber-reinforced composite material (9) was 53%. The CAI strength was measured as described in Example 1 and as a result found to be 228 MPa.

Comparative Example 3

Seventy parts of "Grilamid" (registered trademark) TR90 (produced by EMS-CHEMIE (Japan) Ltd., glass transition temperature 155° C.) as an amorphous polyamide having 3,3'-dimethyl-4,4'-diaminodicyclohexylmethane skeleton and 30 parts of AK-601 (produced by Nippon Kayaku Co., Ltd., ingredient hexahydrophthalic acid diglycidyl ester) were kneaded according to the same procedure as that of Example 1. However, the respective raw materials were discharged as separated without being compatible with each other, and no binder composition could be obtained.

Comparative Example 4

Sixty five parts of "SUMIKAEXCEL" (registered trademark) PES5003P (produced by Sumitomo Chemical Co., Ltd., glass transition temperature 277° C.) as the amorphous polyethersulfone used in Comparative Example 1 and 35 parts of "TOPCIZER" (registered trademark) 1-go S (Fuji Amide Chemical Co., Ltd., ingredient p-toluenesulfonamide) were kneaded and freeze-ground according to the same procedure as that of Comparative Example 1, to obtain a binder-composition (10). The obtained binder composition (10) had a volume average particle size of 79 μm and a glass transition temperature of 82° C.

Ten parts of the obtained binder composition (10) and 100 parts of the aforementioned main agent were mixed, and the mixture was stirred at a temperature of 180° C. for 1 hour and then cooled to 70° C. An adequate amount was taken from the obtained mixture onto a slide glass and observed at magnifications of 5× and 40× using a light-field optical microscope. No solid was confirmed. The viscosity, of the mixture at 70° C. was measured and found to be 654 mPa·s. The viscosity of the mixture was 10.7 times the viscosity of the main agent not in conformity with the condition (II).

(Preparation of Reinforcing-Fiber Base Material (10))

A reinforcing-fiber base material (10) having the binder composition (10) was obtained according to the same procedure as that of Example 1, except that the obtained binder composition (10) was used.

(Preparation of Preform (10))

A preform (10) was obtained according to the same procedure as that of Example 1, except that the obtained reinforcing-fiber base material (10) was used.

(Molding of Fiber-Reinforced Composite Material (10))

A fiber-reinforced composite material (10) was obtained according the same procedure as that of (Molding of fiber-reinforced composite material (1a)) of Example 1. The volume content of the carbon fibers of the obtained fiber-reinforced composite material was 56%. The CAI strength was measured as described in Example 1 and as a result found to be 248 MPa.

TABLE 1

| | Trade name | Ingredient | Tg [° C.] | Example 1-1 | Example 1-2 | Example 2 | Example 3 | Example 4 | Example 5 |
|---|---|---|---|---|---|---|---|---|---|
| Component [A] | Grilamid ® TR55 | morphous polyamide containing 3,3'-dimethyl-4,4'-diamino-dicyclo-hexylmethane skeleton | 160 | 70 | 70 | — | — | — | — |
| | Grilamid ® TR90 | Amorphous polyamide containing 3,3'-dimethyl-4,4'-diamino-dicyclo-hexylmethane skeleton | 155 | — | — | 70 | 60 | 55 | 70 |
| Comparative | SUMIKA-EXCEL☐ RES5003P | Polyether-sulfone | 227 | — | — | — | — | — | — |
| | Nylon 12 nonwoven fabric | Nylon 12 (crystalline) | 50 (m.p. 176) | — | — | — | — | — | — |
| Component [B] | TOP-CIZER ® 5-go | O/p-toluene-sulfonamide | — | 30 | 30 | — | — | — | — |
| | TOP-CIZER ® 1-go-S | P-toluene-sulfonamide | — | — | — | 30 | — | 30 | 25 |
| | EBSA | P-ethyl-benzene-sulfonamide | — | — | — | — | 40 | — | — |
| Comparative | AK-601 | Hexahydro-phthalic acid diglycidyl ester | — | — | — | — | — | — | — |
| Component [C] | TPAE-8 | Polymerized fatty acid-based polyamide elastomer | — | — | — | — | — | 15 | — |
| | PANDEX ® T-1185 | Urethane elastomer | — | — | — | — | — | — | 5 |
| Binder Tg (condition I) | | | [° C.] | 70 | 70 | 64 | 65 | 67 | 74 |
| Volume average particle size | | | [μm] | 86 | 86 | 92 | 88 | 85 | 82 |
| Solubility evaluation result (condition II) | | Whether or not solid remained | [—] | Remained | Remained | Remained | Remained | Remained | Remained |
| | | Viscosity of filtrate | [mPa·s] | 246 | 246 | 235 | 222 | 256 | 242 |
| | | Viscosity rise rate | [times] | 4.0 | 4.0 | 3.9 | 3.6 | 4.2 | 4.0 |
| Curing conditions | | Primary curing | [—] | 140° C. × 2 hr | 180° C. × 2 hr | 140° C. × 2 hr | 140° C. × 2 hr | 140° C. × 2 hr | 140° C. × 2 hr |
| | | Secondary curing | [—] | 180° C. × 2 hr | — | 180° C. × 2 hr | 180° C. × 2 hr | 180° C. × 2 hr | 180° C. × 2 hr |
| | | Heating rate | [° C./min] | 1.5 | 1.5 | 1.5 | 1.5 | 1.5 | 1.5 |
| Volume content of carbon fibers, Vf | | | [%] | 56 | 58 | 57 | 57 | 57 | 56 |
| Compression-after-impact (CAI) strength, (6.76 J/mm) | | | [MPa] | 275 | 290 | 276 | 266 | 281 | 277 |

TABLE 2

| | Trade name | Ingredient | Tg [°C.] | Comparative Example 1-1 | Comparative Example 1-2 | Comparative Example 2 | Example 6 | Example 7 | Comparative Example 3 | Comparative Example 4 |
|---|---|---|---|---|---|---|---|---|---|---|
| Component [A] | Grilamid ® TR55 | morphous polyamide containing 3,3'-dimethyl-4,4'-diamino-dicyclohexylmethane skeleton | 160 | — | — | — | 35 | — | — | — |
| | Grilamid ® TR90 | Amorphous polyamide containing 3,3'-dimethyl-4,4'-diamino-dicyclohexylmethane skeleton | 155 | — | — | — | — | 10 | 70 | — |
| Comparative | SUMIKA-EXCEL☐ RES5003P | Polyethersulfone | 227 | 60 | 60 | — | — | — | — | 65 |
| | Nylon 12 nonwoven fabric | Nylon 12 (crystalline) | 50 (m.p. 176) | — | — | 100 | — | — | — | — |
| Component [B] | TOP-CIZER ® 5-go | O/p-toluenesulfonamide | — | — | — | — | — | — | — | — |
| | TOP-CIZER ® 1-go-S | P-toluenesulfonamide | — | — | — | — | 65 | 50 | — | 35 |
| | EBSA | P-ethylbenzenesulfonamide | — | — | — | — | — | — | — | — |
| Comparative | AK-601 | Hexahydrophthalic acid diglycidyl ester | — | 40 | 40 | — | — | — | 30 | — |
| Component [C] | TPAE-8 | Polymerized fatty acid-based polyamide elastomer | — | — | — | — | — | 40 | — | — |
| | PANDEX ® T-1185 | Urethane elastomer | — | — | — | — | — | — | — | — |
| Binder Tg (condition I) | | | [°C.] | 68 | 68 | 50 (m.p. 176) | 52 | 38 | Incompatible | 82 |
| Volume average particle size | | | [μm] | 90 | 90 | Nonwoven fabric | 112 | 120 | Incompatible | 79 |
| Solubility evaluation result (condition II) | | Whether or not solid remained | [—] | Did not remain | Did not remain | Remained | Remained | Did not remain | — | Did not remain |
| | | Viscosity of filtrate | [mPa·s] | 600 | 600 | 85 | 427 | 586 | — | 654 |
| | | Viscosity rise rate | [times] | 9.8 | 9.8 | 1.4 | 7.0 | 9.6 | — | 10.7 |
| Curing conditions | | Primary curing | [—] | 140° C. × 2 hr | 180° C. × 2 hr | 140° C. × 2 hr | 140° C. × 2 hr | 140° C. × 2 hr | — | 140° C. × 2 hr |
| | | Secondary curing | [—] | 180° C. × 2 hr | — | 180° C. × 2 hr | 180° C. × 2 hr | 180° C. × 2 hr | — | 180° C. × 2 hr |
| | | Heating rate | [°C./min] | 1.5 | 1.5 | 1.5 | 1.5 | 1.5 | — | 1.5 |
| Volume content of carbon fibers, Vf | | | [%] | 56 | 61 | 53 | 53 | 53 | — | 56 |
| Compression-after-impact (CAI) strength, (6.76 J/mm) | | | [MPa] | 250 | 195 | 190 | 221 | 228 | — | 248 |

The invention claimed is:

1. A binder composition comprising components [A] and [B]:
   [A] an amorphous polyamide with a glass transition temperature of 140° C. or higher and comprising a dicyclohexylmethane unit; and
   [B] toluenesulfonamide; the binder composition contains 40 to 80 mass % of the component [A] and 10 to 40 mass % of the component [B]; and the binder composition complies with the following conditions I) and (II):

Condition (I): the glass transition temperature of the binder composition is 40 to 90° C.; and Condition (II): when the mixture obtained by mixing 10 parts by mass of the binder composition with 100 parts by mass of an epoxy resin containing 40 mass % or more of N,N,N',N'-tetraglycidyl-4,4'- methylenedianiline and stirring at a temperature of 180° C. for 1 hour is observed at a magnification of 5× using a light-field optical microscope, solid particles of the binder composition with particle sizes of 10 μm or larger can be observed, and the viscosity the filtrate obtained by filtering the solid particles from the mixture is 5 times or less the viscosity of the epoxy resin not yet mixed.

2. The binder composition, according to claim 1, wherein the component [A] is a polyamide containing 3,3'-dimethyl-4,4'-diaminodicyclohexylmethane units.

3. The binder composition, according to claim 1, wherein the binder composition further contains a thermoplastic elastomer as component [C].

4. The binder composition, according to claim 3, wherein the component [C] comprises a polyamide elastomer.

5. The binder composition, according to claim 1, wherein the binder composition is in a form of particles having a volume average particle size of 30 to 200 μm.

* * * * *

UNITED STATES PATENT AND TRADEMARK OFFICE
CERTIFICATE OF CORRECTION

| | |
|---|---|
| PATENT NO. | : 9,062,203 B2 |
| APPLICATION NO. | : 13/496759 |
| DATED | : June 23, 2015 |
| INVENTOR(S) | : Shinji Kochi et al. |

Page 1 of 1

It is certified that error appears in the above-identified patent and that said Letters Patent is hereby corrected as shown below:

On title page, item (73) Assignee, Line 1
        replace "TORY INDUSTRIES INC., Tokyo (JP)"
        with --TORAY INDUSTRIES INC., Tokyo (JP)--.

Signed and Sealed this
Eighth Day of December, 2015

Michelle K. Lee
*Director of the United States Patent and Trademark Office*